July 1, 1969 R. R. HAWKINS 3,452,641
TRACER CONTROL APPARATUS WITH MEANS TO CORRECT TRACE RATE ERROR
Filed March 30, 1967
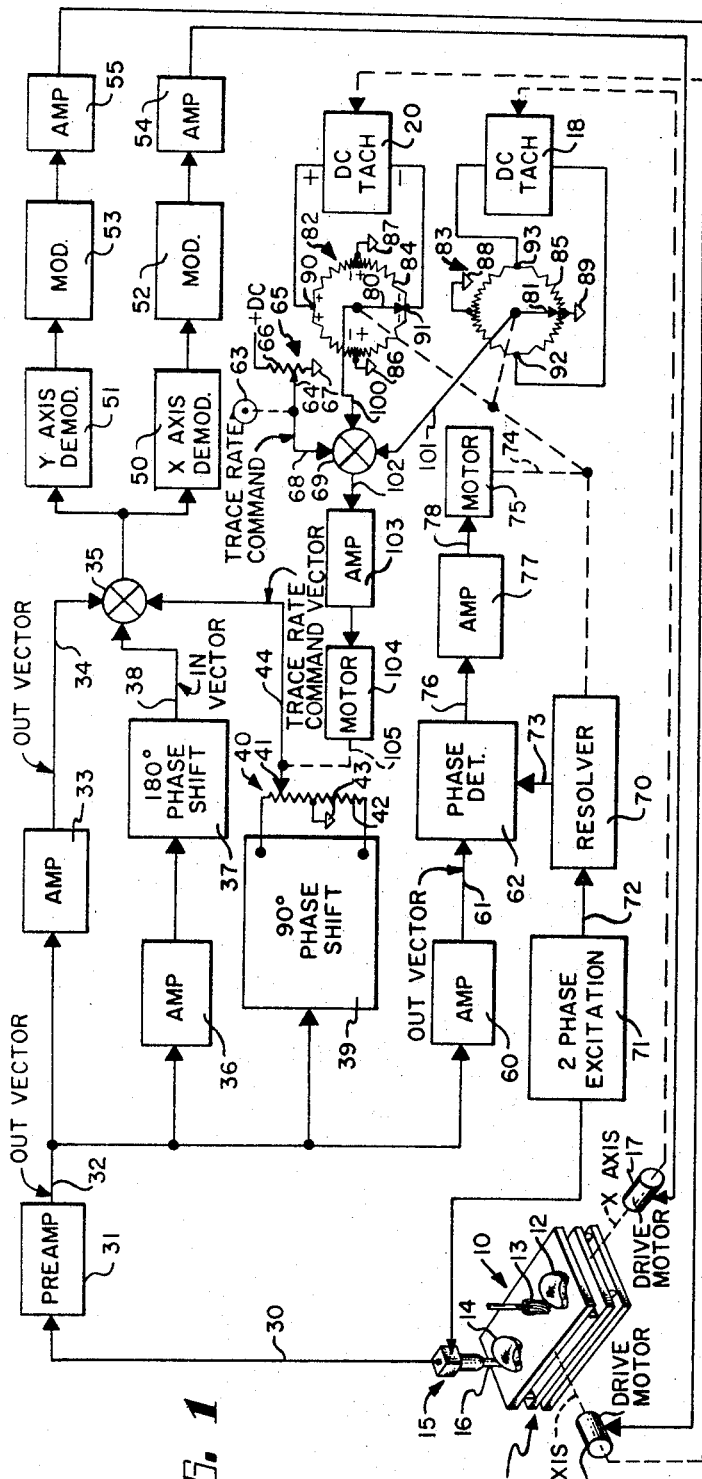
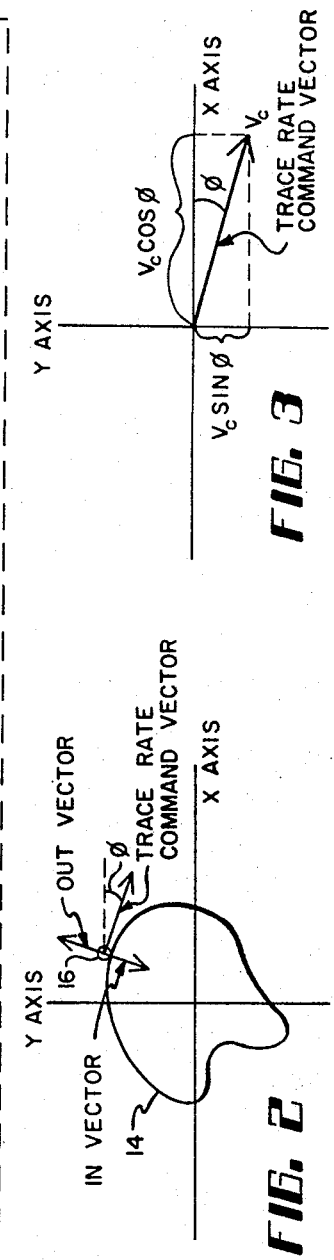
*INVENTOR.*
ROYAL R. HAWKINS
BY
ATTORNEY

United States Patent Office 3,452,641
Patented July 1, 1969

3,452,641
TRACER CONTROL APPARATUS WITH MEANS TO CORRECT TRACE RATE ERROR
Royal R. Hawkins, Bloomington, Minn., assignor to Honeywell Inc., Minneapolis, Minn., a corporation of Delaware
Filed Mar. 30, 1967, Ser. No. 627,105
Int. Cl. B23c 1/16, 1/18
U.S. Cl. 90—13.5                    10 Claims

ABSTRACT OF THE DISCLOSURE

A tracer control apparatus having a pair of 360° potentiometers, the physical position of the potentiometer wipers being controlled respectively in accordance with the sine of the trace rate command vector (sine $\phi$) and the cosine of the trace rate command vector (cosine $\phi$), and the potentiometer resistance elements having voltages applied thereto which are indicative respectively of the magnitude of the machine tool trace rate vector multiplied by the sine of the trace rate command vector ($V_m$ sine $\phi$) and the magnitude of the machine tool trace rate vector multiplied by the cosine of the trace rate command vector ($V_m$ cosine $\phi$), such that the magnitude of the voltage on one potentiometer wiper is indicative of the quantity $V_m$ sine$^2$ $\phi$ and the magnitude of the voltage on the other potentiometer wiper is indicative of the quantity $V_m$ cosine$^2$ $\phi$, and the sum of these two magnitudes ($V_m$ sine$^2$ $\phi + V_m$ cosine$^2$ $\phi$) is indicative of the magnitude of the machine tool trace rate vector ($V_m$), and this magnitude is compared to a trace rate command signal ($V_c$) and is utilized to correct error in the machine tool trace rate vector.

Background of the invention

Prior art tracer control apparatus control the reversible X and Y drives of an associated machine tool as a tracer head stylus traces the outline of a templet. One type of such apparatus generates an AC "out" vector from the tracer head, the magnitude of the vector being indicative of the amount of deflection of the stylus, and the phase angle of the vector being indicative of the direction of the deflection as referenced to the X and Y axis of the machine tool. The "out" vector is compared to an oppositely phased AC "in" vector to establish a normal stylus deflection. An AC trace rate command vector phased 90° from the "out" vector, controls the X and Y drives of the machine tool to cause the stylus to trace the outline of the templet. The movement of the X and Y drives establishes a machine tool trace rate vector in accordance with the actual movement of the tool, as achieved by action of the "in", "out" and "trace rate command" vectors. Such prior art apparatus is shown in the United States Patent 2,962,645, issued on Nov. 29, 1960, to J. J. Rudolf, Jr. et al.

My invention relates to means to correct the rate of movement of the X and Y drives of the machine tool to correct the machine tool trace rate vector, if such correction is necessary.

Summary of the invention

My invention provides trace rate error correction by means of structure which responds to (1) the machine tool trace rate vector as referenced to the X-Y coordinate system of the machine tool and as resolved to its X and Y axis components, and (2) the phase angle of the "out" vector. The structure of my invention then originates two control effects, the first control effect being indicative of the product of the magnitude of the machine tool trace rate vector and the square of the sine of the phase angle of the trace rate command vector ($V_m$ sine$^2$ $\phi$), the second control effect being indicative of the product of the magnitude of the machine tool trace rate vector and the square of the cosine of the trace rate command vector ($V_m$ cosine$^2$ $\phi$). These two effects are added to produce a signal whose magnitude is indicative of the machine tool trace rate vector ($V_m$) then being produced by the tracer apparatus. This signal is compared to a command signal ($V_c$) which, through the medium of the tracer control apparatus, is producing the machine tool trace rate vector ($V_m$). If the tracer control apparatus is not producing the desired trace rate ($V_c$), the comparison of these two signals is utilized to correct the error.

Brief description of the drawing

FIGURE 1 is a schematic showing of a tracer control apparatus utilizing my invention, with the apparatus connected to control a machine tool, the machine tool being only partially disclosed.

FIGURE 2 is a showing of the templet of FIGURE 1, placed in the X-Y coordinate system of the machine tool, and showing the point of engagement of the tracer head stylus and the AC vectors which are originated by the tracer control apparatus, but not necessarily the vectors which are originated by the apparatus as shown in FIGURE 1, and FIGURE 3 is a showing of the X-Y axis resolution of the trace rate command vector of FIGURE 2.

Description of the preferred embodiments

Referring to FIGURE 1, reference numeral 10 designates generally a machine tool which is to be controlled. This machine tool includes a table 11, having mounted thereon a workpiece 12 with a tool 13 engaging the workpiece, and a templet 14 to be traced by a tracer head 15 having a stylus 16 engaging the templet. Table 11 is constructed and arranged for movement along a pair of mutually perpendicular axes, identified respectively by the legends X-axis and Y-axis. Movement along the X-axis is controlled by a drive motor 17 also connected to drive a DC tachometer 18. Movement along the Y-axis is controlled by a motor 19 also connected to drive a DC tachometer 20.

Apparatus of this general type is well known in the art, for example the above mentioned patent issued to J. J. Rudolph, Jr., et al.

Motors 17 and 19 are energized to produce movement along the X and Y axes to cause stylus 16 to always move in a direction tangential to templet 14 at the point of engagement. Motors 17 and 18 are capable of reversibly driving the machine tool along the axes. For example, should stylus 16 be engaging a surface of templet 14 which is parallel to the Y-axis, then only drive motor 19 is energized. For surfaces of templet 14 which are contoured to have a direction inclined to the X and Y axes, simultaneous energization of motors 17 and 19 produces the required movement. This movement is defined on the machine tool trace rate vector ($V_m$). This vector has a magnitude and a direction. The vector $V_m$, when resolved to the X and Y axes components gives the individual motion of motors 17 and 19. If this individual motion is correct, the magnitude of vector $V_m$ is equal to the magnitude of the trace rate command vector ($V_c$) as originated by the trace control apparatus. The stylus 16 traces and moves tangential to the templet 14. In this manner, stylus 16 is "steered" around templet 14.

Tracer head 15 is constructed and arranged to provide an AC control signal from which the tracer control apparatus derives all of its information. This AC control signal is called the "out" vector and appears at line 30.

The "out" vector is amplified by pre-amplifier 31 and then appears at line 32. At this point four control effects take place.

The first control effect is achieved by an amplifier 33 which amplifies the "out" vector and applies it to a summation point 35 by way of line 34.

The second control effect is achieved by an amplifier 36 which connects the "out" vector to a 180° phase shift network 37. The "out" vector is shifted 180° in phase, clipped at a predetermined magnitude, and is applied to line 38 as an "in" vector. Line 38 connects the "in" vector to summation point 35.

The third control effect is achieved by a 90° phase shifting network 39 whose output includes a potentiometer 40 having a movable wiper 41, a resistance element 42, and a tap which is connected to a source of reference potential at 43. Wiper 41 is connected to line 44 and the AC signal present on this line is the "trace rate command" vector. This vector is of a magnitude which is determined by the position of wiper 41 and of a phase angle which is shifted ±90° from that of the "out" vector, in accordance with a need to trace clockwise or counter-clockwise about templet 14. The AC voltage present in wiper 41 is shifted 180° as the wiper moves from one side of the potentiometer tap to the other side of the tap. Line 44 connects the trace rate command vector to summation point 35.

The fourth control effect is derived from amplifier 60 which applies the "out" vector to a phase detector 62 by way of line 61 for a purpose to be described.

Referring to FIGURE 2, this figure discloses the X–Y coordinate system of the machine tool of FIGURE 1 and shows the point of engagement of tracer head stylus 16 to templet 14. The AC vectors, above described, are shown superimposed in the coordinate system to show their relationship to the X–Y axis of the machine tool.

These three vectors are summed at summation point 35 and the resultant vector is applied to the inputs of X-axis demodulator 50 and Y-axis demodulator 51. Demodulators 50 and 51 are constructed and arranged to provide DC output voltages of magnitudes which are directly related to the X-axis and Y-axis resolution of the trace rate command vector of FIGURE 2, assuming that the "in" vector is equal in magnitude to the "out" vector. Referring to FIGURE 3, the trace rate command vector of FIGURE 2 is placed in the X–Y axis coordinate system and is resolved into its two components, the X-axis component being identified as $V_c$ cosine $\phi$ and the Y-axis component being identified as $V_c$ sine $\phi$, where $V_c$ is the magnitude of the trace rate command vector and $\phi$ is the angle that this vector makes to the X-axis.

The outputs of the X-axis demodulator 50 and the output of Y-axis demodulator 51 are respectively the X and Y quadrature components of the resultant vector derived from summation point 35. For simplicity we have assumed that the "in" and "out" vectors cancel, thus, the resultant vector is the same as the trace rate command vector. The output of each of the demodulators, a DC signal, is applied respectively to the input of modulators 52 and 53, where these signals are converted to AC signals having magnitudes corresponding to the magnitudes of the respective DC signals. These AC signals are amplified by amplifiers 54 and 55 and are then connected to control respectively the direction and speed of drive motors 17 and 19.

A control knob 63 establishes a desired magnitude for the trace rate command vector $V_c$ by producing a trace rate command DC voltage $V_c'$ at the wiper 64 of a potentiometer 65 whose resistance element 66 has one terminal connected to a positive source of DC voltage and has the other terminal connected to the source of reference potential at 67. The positive DC voltage provided at wiper 64 is connected to summation point 69 by line 68.

As has been mentioned, DC tachometers 18 and 20 are driven respectively by drive motors 17 and 19. Thus, the DC output voltage of the tachometers is indicative of the rate of drive of the machine tool along the axes of the machine tool. Since the rate of movement of the machine tool along its X and Y axes is the X and Y resolution of the machine to trace rate vector ($V_m$), the output of the DC tachometers is likewise indicative of this resolution. Thus, the output of tachometer 18 is indicative of the quantity $V_m$ cosine $\phi$ and the output of tachometer 20 is indicative of $V_m$ sine $\phi$, where $V_m$ is the magnitude of the machine tool trace rate vector, that is the actual movement of tool 13 in the X–Y coordinate system, and $\phi$ is the angle that this vector makes to the X-axis.

Reference numeral 70 identifies a rotary resolver which receives two phase reference excitation from source 71 by way of line 72. The output of resolver 70 appears at line 73 and is applied to phase detector 62. The phase of the output at 73 is determined by the position of the movable member of resolver 70, as controlled by mechanical connection 74 which is controlled by motor 75.

Phase detector 62 functions to compare the phase of the "out" vector, present on line 61, with the phase of the output of resolver 70, present on line 73. When these two vectors are not in quadrature (90° out of phase), phase detector 62 provides a reversible polarity of DC output at line 76. This output is amplified by amplifier 77 and is connected to reversibly control motor 75 by way of line 78. Motor 75 is effective to reposition the movable member of resolver 70, to cause the phase angle of the signal present at line 73 to be in quadrature with the phase angle of the "out" vector present at line 61. Thus, the position of motor 75, and its mechanical connection 74, is indicative of the phase angle of the "out" vector.

Mechanical connection 74 is also connected to control the position of wipers 80 and 81 of two 360° potentiometers 82 and 83. The resistance elements 84 and 85 of these potentiometers have four points of connection, spaced at 90° intervals about the resistance element. First and second points of each of the resistance elements are connected to the source of reference potential, as at 86, 87, 88 and 89. Third and fourth points of each of the resistance elements are connected to the outputs of the tachometers 18 and 20, as at 90, 91, 92 and 93.

Potentiometers 82 and 83 are nonlinear wound such that the resistance gradient between points 86 and 87 approximates the cosine function, and the resistance gradient between points 88 and 89 also approximates the cosine function. Points 86, 87, 88 and 89 are maximum gradient points. Points 90, 91, 92 and 93 are minimum gradient points.

The points of connection of the resistance elements of potentiometers 82 and 83 to the source of reference potential and to the outputs of the tachometers 18 and 20, and the position of the potentiometer wipers is such that a unique DC voltage is provided at lines 100 and 101.

The DC voltage at line 100 is indicative of the quantity $V_m$ sine$^2$ $\phi$ and the voltage at line 101 is indicative of the quantity of $V_m$ cosine$^2$ $\phi$.

The voltage on lines 100 and 101 is summed at summation point 69 to give the sum of the $V_m$ sine$^2$ $\phi$ and $V_m$ cosine$^2$ $\phi$, the sum equaling $V_m$. Summation point 69 sums this quantity $V_m$ with the quantity $V_c'$ (the trace rate command) on line 68.

If the tracer control apparatus is not driving the machine tool to produce the required trace rate command $V_c'$, an output from the summation point 69 is applied to line 102 and to amplifier 103 where it then controls a motor 104 connected mechanically, by means of connection 105, to control the position of potentiometer wiper 41. Thus, the trace rate command vector $V_c$ is adjusted until the required machine tool trace rate vector $V_m$ is produced.

In FIGURE 1 stylus 16 is shown engaging a surface of templet 14 which is parallel to the Y axis of the machine tool. Thus, the machine tool is not moving in the X axis. As a result, there is no voltage present at the output of tachometer 18 and wiper 81 (positioned in accordance with the cosine of the angle $\phi$, which is 90°) is connected to the point of reference potential 89 such that no voltage is applied to line 101. The rate of drive of the Y axis of the machine tool appears as a voltage at the output of tachometer 20, this voltage being of the polarity shown. This voltage is applied to terminals 90 and 91 of potentiometer 82 resistance element and provides a voltage distribution around this resistance element which is of the polarity shown. Thus, a negative voltage is applied to line 100. So long as the negative voltage on line 100 is equal in magnitude to the positive voltage on line 68, wiper 41 of potentiometer 40 does not move. The trace rate command vector $V_c$ being produced at line 44 is sufficient to produce the required machine tool rate vector $V_m$. If an error exists, however, wiper 41 moves in a direction to correct the magnitude of the trace rate command vector.

For example, if the voltage on line 100 is greater in magnitude than the voltage on line 68, this is indicative of the fact that the machine tool is moving too fast along the Y axis. This negative voltage is applied to the input of amplifier 103 and causes motor 104 to move potentiometer wiper 41 in a downward direction, reducing the magnitude of the trace rate command vector. At very slow drive rates, it is possible, because of the dynamics of the individual machine tool, that it will be necessary to not only move wiper 41 toward the tap of the potentiometer, but to actually move the wiper slightly on the other side of the tap to thus feed a reverse direction trace rate command vector to summation point 35.

For purposes of simplicity, I have not shown the means by which the trace direction may be changed from clockwise to counter-clockwise. This is achieved by selecting either +90° or —90° for the phase shift accomplished by network 39, causing a 180° shift in the direction of the trace rate command vector.

When the tracer control apparatus is tracing in one direction, for example the counter-clockwise direction, the polarity output of each of the tachometers 18 and 20 will be opposite to that which exists when the apparatus is tracing in the clockwise direction, assuming identical dynamic modes of operation. To reverse the direction of trace, it is necessary to reverse the polarity of $V_c$ on potentiometer 65 and to reverse the control action of motor 104 in response to signals from amplifier 103, thus maintaining balance between $V_c'$ and the reversed polarity tachometer voltages. The wipers 80 and 81 do not change position when tracing direction is reversed.

The embodiments of the invention in which an exclusive property or right is claimed are defined as follows:

1. In a tracer control apparatus, for use with a machine tool capable of movement in a coordinate system formed by two mutually perpendicular axes, and to produce movement of the machine tool, the control apparatus being of the type having means to provide a displacement vector signal of a magnitude dependent upon the positional displacement of a tracer and of a phase angle dependent upon the direction of such displacement relative to the coordinate system of movement of the machine tool, and having trace rate means to provide a control trace rate command vector signal of a magnitude indicative of a desired trace rate and of a phase angle displaced 90° from the phase angle of the displacment signal, the improvement comprising;

first means, adapted to be connected to the machine tool to be controlled by the movement of the machine tool, and connected to said tracer to be controlled by said displacement vector phase angle, to produce first and second control effects, the first control effect being indicative of the product of the magnitude of a machine tool trace rate vector and the square of the sine of the control trace rate vector, the second control effect being indicative of the product of the magnitude of the machine tool trace rate vector and the square of the cosine of control trace rate vector, trace rate command means to provide a command signal of a magnitude indicative of the desired trace rate, comparing means connected to said first means and to said trace rate command means to compare the magnitude of said command signal to the magnitude of the sum of said first and second control effects, and means controlled by said comparing means to modify said control trace rate vector signal.

2. The tracer control apparatus as defined in claim 1 wherein said means controlled by said comparing means modifies the magnitude of said control trace rate vector signal.

3. The tracer control apparatus as defined in claim 1 wherein said first means includes a pair of first members adapted to be connected to the machine tool to respond respectively to the X and Y axis components of the machine tool trace rate vector, and a pair of second members connected to said tracer to respond respectively to the sine and cosine of the control trace rate vector.

4. The tracer control apparatus as defined in claim 3 wherein said means controlled by said comparing means modifies the magnitude of said control trace rate vector signal.

5. The tracer control apparatus as defined in claim 3 wherein said pair of first members and said pair of second members are interconnected to effect the combination of the X component of the machine tool trace rate vector with the cosine of the control trace rate vector to produce said second control effect, and to effect the combination of the Y component of the machine tool trace rate vector with the sine of the control trace rate vector to produce said first control effect.

6. The tracer control apparatus as defined in claim 1 wherein said first means includes a pair of 360° potentiometers whose resistance elements are adapted to be connected to the machine tool to have voltages applied thereto which are respectively indicative of the X and Y axis components of the machine tool trace rate vector, and whose wipers are connected to said tracer to respond respectively to the cosine and sine of the control trace rate vector.

7. The tracer control apparatus as defined in claim 1 wherein said trace rate command means includes a source of DC voltage of a variable magnitude and of a first polarity with respect to a point of reference potential; wherein said first means includes a pair of 360° potentiometers each having resistance elements formed to produce a cosinusoidal resistance gradient whose points of greatest resistance gradient are each connected to said point of reference potential at first and second points which are displaced 180° from each other, and are adapted to be connected to the machine tool to have a DC voltage applied to each resistance by virtue of a connection to third and fourth points of minimum resistance gradient which are displaced 90° from said first and second points, and whose wipers are connected to said tracer to be positioned such that the summation of the voltages on the wipers of said potentiometers is of a polarity opposite to said first polarity and of a magnitude indicative of the magnitude of the machine tool trace rate vector; and wherein said comparing means compares said voltage of said first polarity to said summation of said opposite polarity.

8. The tracer control apparatus as defined in claim 7, wherein said control trace rate vector signal may be of a phase angle displaced ±90° from the phase angle of the displacement signal to thereby selectively provide clockwise or counterclockwise tracing of the tracer, and wherein said means controlled by said comparing means includes means to adjust the magnitude of said control trace rate vector and capable of reversing the phase thereof as determined by said comparing means.

9. The tracer control apparatus as defined in claim 7, including a pair of DC tachometers adapted to be connected one to each of the axes of the machine tool such that the output of one of the tachometers is indicative of the X axis component of the machine tool trace rate vector and the output of the other tachometer is indicative of the Y axis component of the machine tool trace rate vector; wherein the output of said one tachometer is connected to said third and fourth points on the resistance element of one potentiometer, and the output of said other tachometer is connected to said third and fourth points on the resistance element of said other potentiometer; and wherein the wiper of said one potentiometer is positioned in accordance with the cosine of the control trace rate vector, and the wiper of said other potentiometer is positioned in accordance with the sine of the control trace rate vector, to produce said first control effect as a DC voltage on the wiper of said other potentiometer and to produce said second control effect as a DC voltage on the wiper of said one potentiometer.

10. The tracer control apparatus as defined in claim 8, including a pair of DC tachometers adapted to be connected one to each of the axes of the machine tool such that the output of one of the tachometers is indicative of the X axis component of the machine tool trace rate vector and the output of the other tachometer is indicative of the Y axis component of the machine tool trace rate vector; wherein the output of said one tachometer is connected to said third and fourth points on the resistance element of one potentiometer, and the output of said other tachometer is connected to said third and fourth points on the resistance element and said other potentiometer; and wherein the wiper of said one potentiometer is positioned in accordance with the cosine of the control trace rate vector, and the wiper of said other potentiometer is positioned in accordance with the sine of the control trace rate vector, to produce said first control effect as a DC voltage on the wiper of said other potentiometer and to produce said second control effect as a DC voltage on the wiper of said one potentiometer.

References Cited

UNITED STATES PATENTS

| | | | |
|---|---|---|---|
| 2,837,707 | 6/1958 | Stokes | 90—13 |
| 2,858,071 | 10/1958 | Stokes | 90—13 |
| 3,195,410 | 7/1965 | Colten et al. | 90—13 |
| 3,285,137 | 11/1966 | Hill et al. | 90—13.5 |

GERALD A. DOST, *Primary Examiner.*